United States Patent
Johnson (10) Patent No.: US 10,882,617 B2
(45) Date of Patent: Jan. 5, 2021

(54) AIRCRAFT BASED AUGMENTED AND VIRTUAL REALITY PASSENGER SOCIAL MEDIA INTERACTION SYSTEM AND RELATED METHOD

(71) Applicant: Rockwell Collins, Inc., Cedar Rapids, IA (US)

(72) Inventor: Glenn A. Johnson, Rural Hall, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 34 days.

(21) Appl. No.: 16/157,611

(22) Filed: Oct. 11, 2018

(65) Prior Publication Data
US 2020/0115056 A1 Apr. 16, 2020

(51) Int. Cl.
*B64D 11/00* (2006.01)
*H04W 4/40* (2018.01)
*G06T 19/00* (2011.01)

(52) U.S. Cl.
CPC ........ *B64D 11/0015* (2013.01); *G06T 19/006* (2013.01); *H04W 4/40* (2018.02)

(58) Field of Classification Search
CPC .......... G02B 2027/0138; G06T 19/006; G06F 3/011; G06F 21/31
See application file for complete search history.

(56) References Cited

U.S. PATENT DOCUMENTS

| | | | | |
|---|---|---|---|---|
| 6,317,127 | B1* | 11/2001 | Daily | G06T 15/10 345/629 |
| 9,160,801 | B1* | 10/2015 | Wise | G06Q 50/01 |
| 9,192,008 | B2* | 11/2015 | Eckel | H05B 47/18 |
| 9,378,601 | B2* | 6/2016 | Ricci | G06Q 30/0265 |
| 9,892,489 | B1* | 2/2018 | Roggendorf | G06T 19/00 |
| 10,237,225 | B1* | 3/2019 | Ande | H04L 51/046 |
| 2009/0254358 | A1* | 10/2009 | Li | G06Q 10/10 705/319 |
| 2009/0319902 | A1* | 12/2009 | Kneller | G06F 3/048 715/733 |

(Continued)

FOREIGN PATENT DOCUMENTS

EP 3079041 A1 10/2016

OTHER PUBLICATIONS

Extended Search Report dated Feb. 12, 2020 for EP Application No. 19202808.

*Primary Examiner* — Amy Onyekaba
(74) *Attorney, Agent, or Firm* — Suiter Swantz pc llo (57) ABSTRACT

A system and method for passenger interaction receives an input from a passenger to create an actual, virtual reality (VR) or augmented reality (AR) environment within which the passenger wishes to immerse and then share via social media. The input includes a passenger order to immediately share the environment, delay sending or store the environment. Each environment includes a characteristic of the passenger as immersed within a location element and vehicle element associated with the vehicle in which the passenger is traveling. The system maintains a hardware suite capable of creation of the desired environment and displaying the environment to the passenger. The system then formats and transmits the environment in a format recognizable by a social media application.

20 Claims, 8 Drawing Sheets

(56) References Cited

U.S. PATENT DOCUMENTS

| | | | | |
|---|---|---|---|---|
| 2011/0029998 A1* | 2/2011 | Yip | ............... | H04N 21/812 |
| | | | | 725/14 |
| 2013/0083061 A1* | 4/2013 | Mishra | ............... | A63F 13/213 |
| | | | | 345/633 |
| 2013/0134730 A1* | 5/2013 | Ricci | ............... | G08G 1/16 |
| | | | | 296/24.34 |
| 2013/0249262 A1* | 9/2013 | Herman | ............... | G08B 6/00 |
| | | | | 297/217.1 |
| 2014/0306814 A1* | 10/2014 | Ricci | ............... | G06K 9/00838 |
| | | | | 340/425.5 |
| 2015/0160019 A1* | 6/2015 | Biswal | ............... | B60W 50/00 |
| | | | | 701/1 |
| 2015/0180999 A1* | 6/2015 | Pisz | ............... | B60K 37/00 |
| | | | | 709/204 |
| 2016/0053977 A1* | 2/2016 | Johannessen | ......... | H05B 45/22 |
| | | | | 315/153 |
| 2016/0284125 A1* | 9/2016 | Bostick | ............... | G06Q 50/01 |
| 2017/0126622 A1* | 5/2017 | Haak | ............... | H04B 7/1851 |
| 2017/0126625 A1* | 5/2017 | Haak | ............... | H04B 7/18506 |
| 2017/0148030 A1* | 5/2017 | Fernandez Acuna | ............... | |
| | | | | G06Q 30/016 |
| 2017/0149722 A1* | 5/2017 | Fernandez Acuna | ... | H04L 67/22 |
| 2017/0180036 A1* | 6/2017 | Schaupmann | ......... | H04N 7/183 |
| 2017/0247000 A1* | 8/2017 | Ricci | ............... | B60R 16/037 |
| 2017/0283086 A1* | 10/2017 | Garing | ............... | B64D 45/0005 |
| 2017/0286037 A1* | 10/2017 | Sizelove | ............ | H04W 12/0808 |
| 2017/0351990 A1* | 12/2017 | Hecht | ............... | G06Q 50/01 |
| 2018/0027036 A1* | 1/2018 | Watson | ............... | H04B 7/18506 |
| | | | | 709/219 |
| 2018/0027037 A1* | 1/2018 | Watson | ............... | H04L 67/2842 |
| | | | | 709/219 |
| 2018/0059913 A1* | 3/2018 | Penilla | ............... | H04W 12/0608 |
| 2018/0130151 A1* | 5/2018 | Kucic | ............... | G06Q 20/36 |
| 2018/0143649 A1* | 5/2018 | Miao | ............... | B60W 60/00 |
| 2018/0234707 A1* | 8/2018 | Pujia | ............... | H04N 21/4532 |
| 2018/0251230 A1* | 9/2018 | Chavez | ............... | B64D 11/0689 |
| 2018/0261186 A1* | 9/2018 | Watson | ............... | G06F 3/147 |
| 2018/0293043 A1* | 10/2018 | Watson | ............... | G09G 5/12 |
| 2018/0369702 A1* | 12/2018 | Hake | ............... | A63G 31/02 |
| 2019/0122543 A1* | 4/2019 | Matus | ............... | G08G 1/096716 |
| 2019/0197748 A1* | 6/2019 | Vandewall | ......... | B64D 11/0015 |
| 2020/0073527 A1* | 3/2020 | Bandishti | ............... | B60K 35/00 |

\* cited by examiner

AIRCRAFT BASED AUGMENTED AND VIRTUAL REALITY PASSENGER SOCIAL MEDIA INTERACTION SYSTEM AND RELATED METHOD

BACKGROUND

While on a lengthy travel experience, a passenger may desire an alternate environment coupled with connectivity with others via a social media interaction. This alternate environment and connectivity may lessen the boredom a passenger may experience while on a long-range flight.

Many countries of the World have witnessed the explosion of Social Media. Within some areas of the world, Social Media interaction has become a largescale cultural phenomenon with 95% plus users in specific populations. The cultural phenomenon has grown to the point that there exists a significant portion of the population that view sharing location and moments of their life with others via a network as a part of their daily routine.

Some users may opt to travel specifically for an opportunity to share the travel experience with others to increase a social status or social following.

Previous attempts at social interaction may create a virtual or augmented reality within which a user may become immersed. However, these attempts may be limited to realities disconnected from a location or vehicle where the user may physically reside.

Therefore, a need remains to offer a passenger an augmented and virtual experience within the cabin of a vehicle to immerse the passenger in a situation allowing the passenger to experience the situation while also sharing the experience with others via the social network.

SUMMARY

Accordingly, a system for passenger interaction may include a passenger computing device implemented within a vehicle, the passenger computing device may include a data storage including at least a location data and a vehicle data, a hardware suite including at least one display and at least one passenger interface, a network interface, and a processor communicatively coupled to the data storage, the hardware suite and the network interface. The processor may execute commands from the passenger including receiving a passenger input and a passenger order from a passenger, generating a passenger environment based on the passenger input, the passenger environment a representation of at least one characteristic of the passenger, at least one characteristic of the location data and at least one characteristic of the vehicle data. The system may configure the passenger environment for a social media recognition; and transmit the passenger environment to a network, the transmitting based on the passenger order.

An additional embodiment of the inventive concepts disclosed herein may comprise a method for passenger interaction. The method may include steps of receiving a passenger input and a passenger order from a passenger, the passenger input and passenger order received via a hardware suite including at least one passenger interface and at least one display. Storing the passenger input and the passenger order within a data storage including at least a location data and a vehicle data. Generating a passenger environment based on the passenger input, the passenger environment a representation of at least one characteristic of the location data and at least one characteristic of the vehicle data. Configuring the passenger environment for a social media recognition, and transmitting the passenger environment to a network via a network interface, the transmitting based on the passenger order It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the presently preferred embodiments of the inventive concepts, examples of which are illustrated in the accompanying drawings. The following description presents certain specific embodiments of the inventive concepts disclosed herein. However, the inventive concepts disclosed herein may be embodied in a multitude of different ways as defined and covered by the claims. In this description, reference is made to the drawings wherein like parts are designated with like numerals throughout.

Overview

Embodiments of the inventive concepts disclosed herein are directed to a system and related method for passenger interaction. The system and method may receive an input from a passenger to create an actual, virtual reality (VR) or augmented reality (AR) environment within which the passenger wishes to immerse and then share via social media. The input includes a passenger order to immediately share the environment, delay sending, or store the environment for later use. Each environment may include a characteristic of the passenger as immersed within a location element and vehicle element associated with the vehicle in which the passenger is traveling. The system maintains a hardware suite capable of creation of the desired environment and displaying the environment to the passenger. The system then formats and transmits the environment in a format recognizable by a social media application.

REFERENCE CHART

Figure 1:
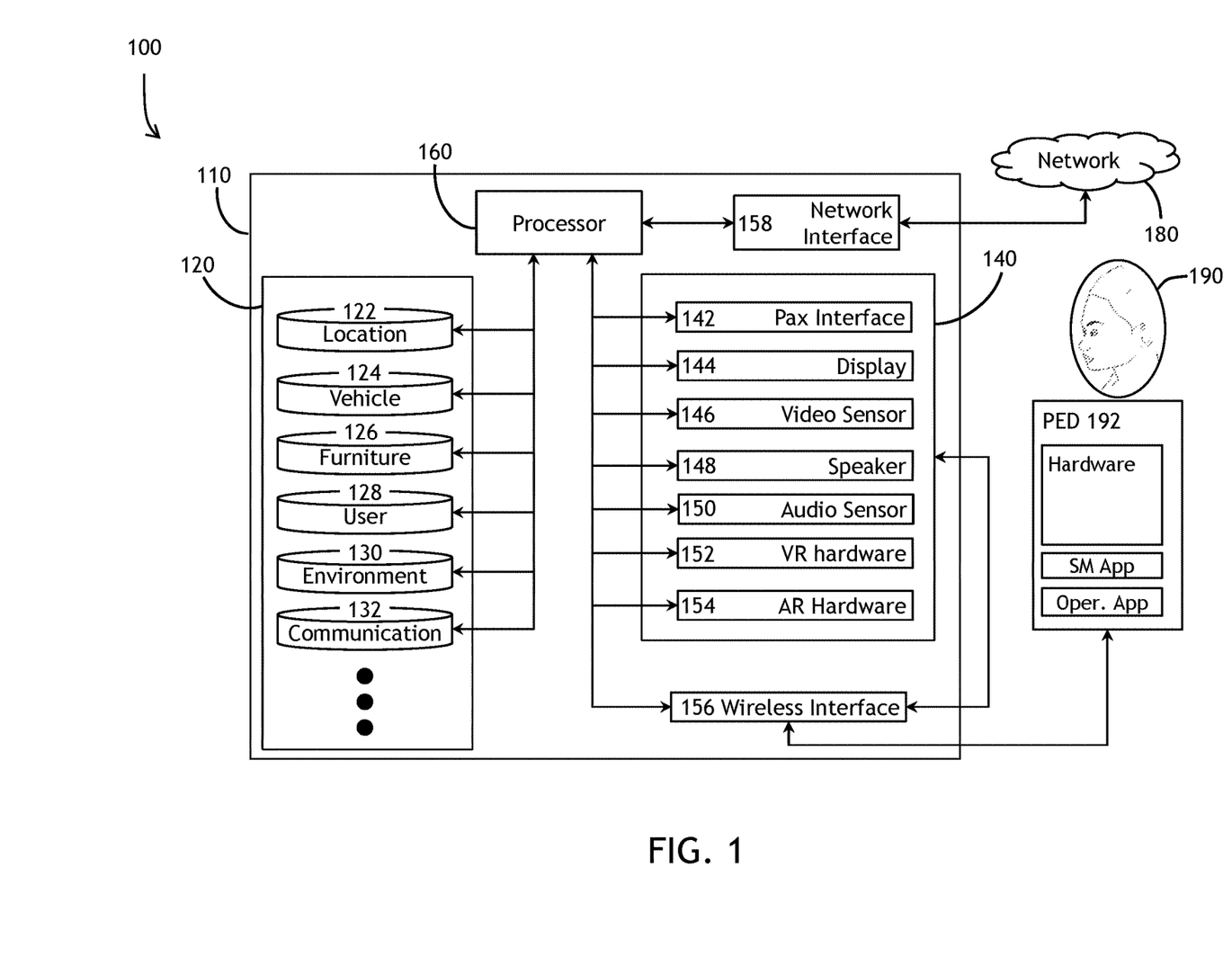
FIG. 1 is a diagram of a system for passenger interaction in accordance with an embodiment of the inventive concepts disclosed herein.

100 System for Passenger Interaction
110 Passenger Computing Device
120 Data Storage
122 Location Data
124 Vehicle Data
126 Furniture Data
128 User Data
130 Environment Data
132 Communication Data
140 Hardware Suite
142 Passenger Interface
144 Display
146 Video Sensor
148 Speaker
150 Audio Sensor
152 Virtual Reality Hardware
154 Augmented Reality Hardware
156 Wireless Interface
158 Network Interface
160 Processor
180 Network
190 Passenger
192 PED
200 Aircraft Cabin View
206 Crewmember Jump seat
292 PED Holding Device
294 Remote Actuator
300 Perspective View of Scene 200
400 View of Passenger Seat
420 Aircraft Seat
422 Seat Cushion
424 Left Side Panel
426 Right Side Panel
428 Seat Light
430 Right Upper Panel
440 Aircraft Overhead Panel
500 Virtual Flight Deck View
550 Virtual Flight Deck
552 Flight Deck Window
600 Rear View of Virtual Flight Deck
700 Forward View of Virtual Flight Deck
752 Virtual Flight Deck Controls
754 Virtual Yoke FIG. 1 System Overview Referring to FIG. 1, a diagram 100 of a system for passenger interaction in accordance with an embodiment of the inventive concepts disclosed herein is shown. Generally, the system for passenger interaction 100 may comprise a passenger computing device 110 implemented within a vehicle. The passenger computing device 110 may comprise a data storage 120 including a location data 122, a vehicle data 124, a furniture data 126, a user data 128, an environ-ment data 130, and a communication data 132. Each of these data sets available to a processor 160 for use.

The system for passenger interaction 100 may also peripherally include a hardware suite 140 comprising a plurality of hardware elements employable by the system 100. A passenger interface 142, a display 144, a video sensor 146, a speaker 148, an audio sensor 150, VR hardware 152, and AR hardware 154 may be employed solely or in concert by the system 100 to create and process the desired passenger environment.

As communication interfaces, the system 100 may employ a wireless interface 156 and a network interface 158 to provide required communication. The wireless interface may be specifically configured for communication with a passenger portable electronic device (PED) 192 while the network interface 158 may offer bi-directional communication with a network 180.

The processor 160 may communicatively couple with each of the elements to perform desired function. In operation, the system 100 may receive a passenger input and a passenger order from the passenger 190, generate a passenger environment based on the passenger input, the passenger environment a representation of at least one characteristic of the passenger 190, the location data 122 and the vehicle data 124. The system 100 may configure the passenger environment for a social media recognition and then transmit the passenger environment via the network interface 158 or store within user data 128 based on the passenger order.

System Implementation

It is contemplated herein the system for passenger interaction 100 may be particularly suitable for use by a passenger 190 during a lengthy travel experience. In one embodiment, the system for passenger interaction 100 may be operational within an aircraft. The system for passenger interaction 100 may be specifically tailored for air travel experience maintaining data sets within the location data 122 of a departure point and a destination of the aircraft. The system for passenger interaction 100 may receive power from the aircraft and the network interface 158 may be specifically tailored to communicate with a ground-based network.

One goal of the inventive concepts disclosed herein may be to change the paradigm associated with long-distance flight. A user of the system for passenger interaction 100 may extract themselves from the rigors of long-distance travel for a significant period during the long-distance travel. For example, a person may be immersed within the system for passenger interaction 100 and interact with her family at home while on an aircraft transpacific route. In this manner, the passenger 190 using the system for passenger interaction 100 may completely self-remove from the uncomfortable nature of long-distance travel.

Also contemplated herein, the system for passenger interaction 100 may be implemented on a bus, train or any other vehicle capable of carrying crewmembers or passengers where a user may desire an alternate environment from that experienced onboard the vehicle during travel experience.

Data Storage

Location Data

In one embodiment of the inventive concepts disclosed herein, the data storage 120 may include the location data 122. Location data 122 may include data associated with a departure location and a destination location of the vehicle as well as additional locations selectable by the passenger 190. For example, one location data 122 may include a plurality of cities throughout the world as well as locations found in popular motion pictures. For example, the passenger 190 may desire a virtual trip to a city found in a space related motion picture or a trip to a scene from an undersea motion picture.

Vehicle Data

The vehicle data 124 may include characteristics of the vehicle on which the passenger 190 is traveling. Vehicle data 124 may include information associated with the train or aircraft the passenger 190 is on as well as a vehicle on which the passenger 190 may wish to travel. For example, as the passenger 190 may become immersed within an environment, the vehicle data 124 may be included within the environment showing the passenger 190 onboard a large commercial aircraft or passenger train.

Vehicle data 124 may further include data associated with a vehicle upon which the passenger 190 wishes to travel. In another example, the passenger 190 may choose to become immersed within a virtual vehicle wherein the vehicle data 124 offers the passenger 190 a view of the interior features of a motion picture related spaceship or submarine. In one exemplary embodiment, the passenger 190 may be sitting in the rear of a large commercial aircraft in coach and stream an environment to a social media platform that shows the passenger 190 sitting in a space ship shooting at alien beings.

Furniture Data

Furniture data 126 may include those features which make unique the interior of the vehicle within which the passenger 190 is traveling. Unique features such as windows, walkways, seat alignment and placement, overhead structure and controls, and seat hardware and controls may be available for use by the system for passenger interaction 100. For example, an environment near a lavatory onboard a commercial aircraft may include bulkhead, a window, and a doorway to the lavatory. The processor 160 may use this furniture data 126 to create a desirable environment for the passenger 190 to experience while waiting for the lavatory.

User Data

User data 128 may include details associated with the passenger 190. The passenger 190 may input physical characteristics such as hair color and eye color. The passenger 190 may provide details associated with a place of residence or contact information as well as login information to a social media platform.

In one embodiment of the inventive concepts disclosed herein, the user data 128 may include a specific level of permissions the passenger 190 may submit to the system for passenger interaction 100 to identify and process data. For example, the passenger 190 may submit a permission to the system for passenger interaction 100 to identify the passenger via facial recognition via the video sensor 146 or proximity recognition via the wireless interface 156. For example, the passenger 190 may permit the system for passenger interaction 100 to access a stored representation of the passenger biometrics to recognize the passenger 190 as well as offer the passenger 190 a simple method of interaction or secure recognition. In this manner, the recognized passenger may interact with the system for passenger interaction 100 without entering a password or username. It is contemplated herein, the user data 128 may be securely stored on each vehicle within a fleet so the next time the passenger may travel on a vehicle within the fleet, the system for passenger interaction 100 may seamlessly recognize the passenger for secure passenger interaction.

Similarly, the system for passenger interaction 100 may recognize the passenger 190 via the wireless interface as the system for passenger interaction 100 may recognize the presence of the PED 192. In this manner, the system for passenger interaction 100 may be enabled by the passenger 190 via the user data 128 to recognize the passenger 190 in a plurality of methods.

Environment Data

Environment data 130 may be defined as data associated with an environment the system for passenger interaction 100 may display to the passenger 190. For example, data associated with a popular sports figure including video and audio data to allow the system to display the sports figure in a photo realistic manner. In an additional example, environment data 130 may include video and audio data associated with a popular motion picture to allow the passenger 190 to immerse within the audio, video, and character interaction details of the motion picture.

Communication Data

Communication data 132 may include those data associated with the transfer of data between the passenger 190 and the network 180. For example, communication data 132 may store each passenger environment for later play back to the passenger 190 or for a later transmission to the network 180. Specific protocols associated with each social medial platform the system for passenger interaction 100 may offer a passenger 190 to communicate with may also be included within communication data 132. For example, a simple text message including a picture may be formatted to be recognizable by a web-based texting and video chat application.

Sophisticated gaming protocols may also be included within communication data 132. For example, a passenger 190 desiring immersion within a web-based game be connected, and seamlessly integrate, with other users within the web-based game.

In one embodiment of the inventive concepts disclosed herein, the data storage 120 may include additional data sets to allow the system for passenger interaction 100 to accomplish its passenger directed task of passenger immersion within a virtual or augmented environment.

Hardware Suite

Passenger Interface

Passenger interface 142 may include physical elements the passenger 190 may use to interact with the system for passenger interaction 100. For example, a simple push button actuator may provide the necessary function to allow the passenger 190 to command the system to perform a specific task. For example, with the push of a seat mounted button, the system for passenger interaction 100 may follow specific steps stored within the user data 128 to comply with the passenger command.

It is contemplated herein, additional hardware and software-based interfaces may be employed to enable the passenger 190 to interact with the system for passenger interaction 100. For example, a voice activated interaction and motion activated interaction may also allow the passenger 190 to interact via the passenger interface.

Display

The display 144 may include a plurality of display devices tailored specifically for the passenger 190 experience. In one embodiment, the display 144 may include a flexible flat panel display where the flexible lighting element may display photorealistic images to the passenger 190. In another example, the display 144 may integrate a flat panel display within a bulkhead or wall of a cabin configuration where the passenger 190 may interact with an image on the display 144. Additionally, the display 144 may be integrated within VR headgear worn by the passenger 144 in a VR experience to display images via the VR headgear.

Video Sensor

Video sensor 146 may include hardware elements such as a camera as well as sensors configured to receive and process images at additional wavelengths in addition to the visual. Video sensor 146 may capture an image and make the image available to the system for passenger interaction 100 for further processing.

Speaker

The speaker 148 may be representative of any device capable of transmission of a signal audible by a human. In one embodiment, the speaker 148 may be a fixed speaker attached to a bulkhead of the vehicle. In another embodiment, the speaker 148 may be integrated with the VR hardware 152 worn by the passenger 190. In yet another exemplary embodiment, the speaker 148 may be representative of a headphone outlet accessible by the passenger 190. In another example, the speaker 148 may include a speaker within the PED 192 controlled by the processor 160 to transmit an audio signal to the passenger 190.

The speaker 148 may be integrated proximal with the display 144 to offer the passenger 190 a multi-sensory experience to interact with the system for passenger interaction 100.

Audio Sensor

Audio sensor 150 may be representative of devices capable of receiving an audio signal. One example of an audio sensor 150 may include a microphone integrated within the VR hardware worn by the passenger. In addition, a simple microphone mounted on a bulkhead of the vehicle may operate as the audio sensor 150. In addition, the microphone within PED 192 may operate to receive an audio signal from the passenger 190 and transmit the audio signal to the processor 160.

Virtual Reality Hardware

VR hardware 152 may include those devices capable of presenting to the passenger 190 a virtual environment. Such a virtual environment may include a three-dimensional visual presentation as well as an audio presentation. In one embodiment, the VR hardware 152 may include headgear worn by the passenger 190. The headgear may include a stereoscopic visual presentation as well as a stereo audio presentation to the passenger 190. In addition, it is contemplated herein, haptic signals, somatosensory signals, olfactory signals, aural signals as well as additional signals able to communicate information to the passenger 190 via the senses. In addition, those devices capable of receiving input from the passenger 190 may be included within VR hardware 152. For example, a joystick, yoke, weapon handgrip, or similar control device allowing the passenger 190 to make inputs to the system for passenger interaction 100 and add a level of realism to a passenger environment.

In addition, the system for passenger interaction 100 may receive input from gloves or footwear fitted with specific tracking devices worn by the passenger 190 may be integrated within the VR hardware. Trackable by the video sensor 146, the gloves and footwear may enable the system for passenger interaction 100 to accurately track the movements of the passenger 190 and use those movements for virtual system manipulation.

Augmented Reality Hardware

AR hardware 154 may include an integration of the passenger surroundings while onboard the vehicle. For example, the system for passenger interaction 100 may maintain within furniture data 126 a virtual version of the passenger seat. As the passenger 190 may interact with the system for passenger interaction 100, the actual seat and the virtual seat may be overlaid to create a seat with virtual functionality different from the actual seat function. The video sensor 146 may operate in concert with the furniture to map the furniture data to the augmented reality presentation. In this manner, the system for passenger interaction 100 may sense movements by the passenger 190 in the physical and then map the passenger movements to additional function in the augmented environment. In another example, doorway or bulkhead onboard the vehicle may be incorporated within furniture data 126 and incorporated within the passenger environment to create an augmented version of the actual interior of the vehicle cabin.

Wireless Interface

Wireless interface 156 may operate as a conduit for radio frequency signals allowing the system for passenger interaction 100 to properly communicate with the various peripherals associated with the system for passenger interaction 100. For example, each of the elements within the hardware suite 140 may be a wired connection with the processor 160 and a wireless connection with the processor 160. In this manner the audio sensor, for example, may communicate with the processor 160 wirelessly via the wireless interface 156. In one example, the wireless interface 156 may operate within the Wi-Fi and or Bluetooth frequency range using a wireless local area network channel in compliance with a wireless protocol such as IEEE 802.11 and or IEEE 802.15.1.

Network Interface

The network interface 158 may allow the system for passenger interaction 100 to effectively communicate with the network 180 in formats recognizable by other users of the network 180. Similar to a bridge between the system for passenger interaction 100 and the network 180, the network interface 158 may enable two-way communication between the system for passenger interaction 100 and the network 180. The network interface 158 may be configured for receiving a network input from the network then sending the network input to the processor 160. The processor 160 may configure the network input for passenger recognition and communicate the network input to the passenger via one element within the hardware suite or the passenger PED.

Portable Electronic Device (PED)

The PED 192 may offer the passenger 190 an additional conduit for interaction with the system for passenger interaction 100. Hardware within the PED 192 may allow video and audio signals to be transmitted to the processor 160 via the wireless interface 156. The PED 192 may fully integrate within the system for passenger interaction 100 based on the user data 128 permission to do so. With passenger 190 permission, the PED 192 may become an extension of the system for passenger interaction 100 allowing the passenger 190 a more personal experience.

Within the PED 192, a social media application (abbreviated SM App in FIG. 1) may possess function desired by the passenger 190 to share the passenger environment via the system for passenger interaction 100, the wireless interface 156, and the network interface 158. For example, a social media application may gain popularity and become a day to day sharing event for a specific user. The popular social media application may then be available when those day to day users become passengers 190 and able to interact with the system for passenger interaction 100.

In addition, an application provided by an operator of the vehicle (abbreviated Oper. App in FIG. 1) may allow the passenger 190 interaction with a system or web-based content provided by the operator. For example, the passenger 190 may have stored the operator application within the PED 192 and the system for passenger interaction 100 may enable passenger interaction with the vehicle operator via the network 180. This vehicle operator interaction may include, for example a request to book an additional travel segment with the operator or gain access to arrival gate information etc.

Figure 2:
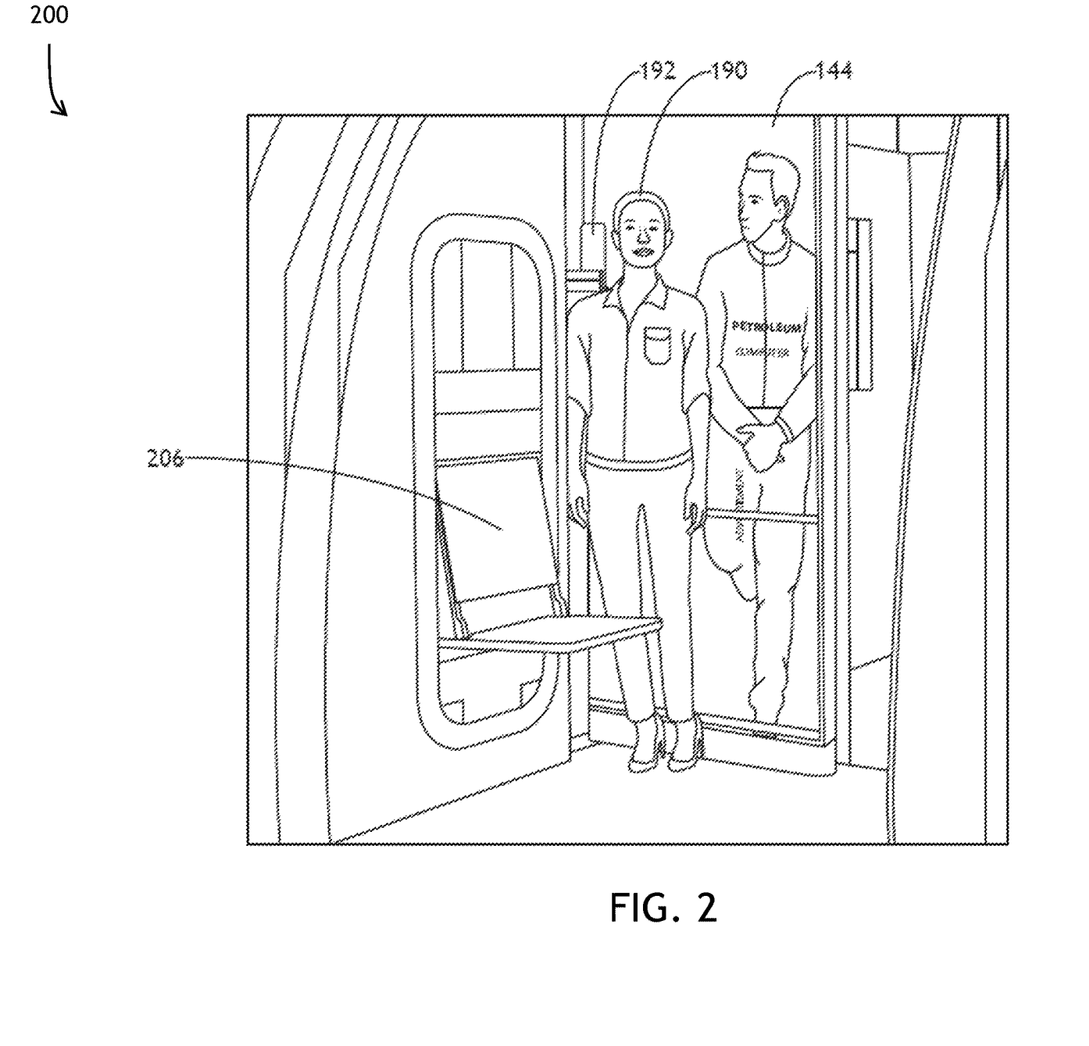
FIG. 2 is a diagram of an exemplary passenger environment presented by the system for passenger interaction in accordance with an embodiment of the inventive concepts disclosed herein.

FIG. 2 Display Interaction

Referring to FIG. 2, a diagram 200 of an exemplary passenger environment presented by the system for passenger interaction 100 in accordance with an embodiment of the inventive concepts disclosed herein is shown. The passenger 190 may choose to interact with the system for passenger interaction 100 while in the cabin of an aircraft. For example, while waiting for the lavatory near a crew jumpseat 206, the passenger 190 may be presented with an environment including a popular sports figure on a display 144. A nearby speaker 148 may ask the passenger 190 if the passenger 190 would like to take a picture next to the sports figure. The passenger 190 may use her PED 192 to take the picture and then command the system for passenger interaction 100 to format and share the image with others via the social media platform.

In one embodiment, the system for passenger interaction 100 may require the passenger 190 to supply a payment for the experience of interaction. In this manner, the operator may generate additional revenue not realized without the system for passenger interaction 100 installed on the vehicle. Another revenue source for the operator may include use of the display 144 for advertising and other connected social media related promotion.

In one embodiment of the inventive concepts disclosed herein, the passenger 190 to use a purpose designed display 144 or large screen area and a PED 192 to place themselves next to their preferred celebrities or in 'social media friendly environments' in motion pictures, at the beach etc. One goal of the inventive concepts disclosed herein may include creating a photo realistic depiction of the passenger 190 with others or in other locations, and to stream this content to social media.

Figure 3:
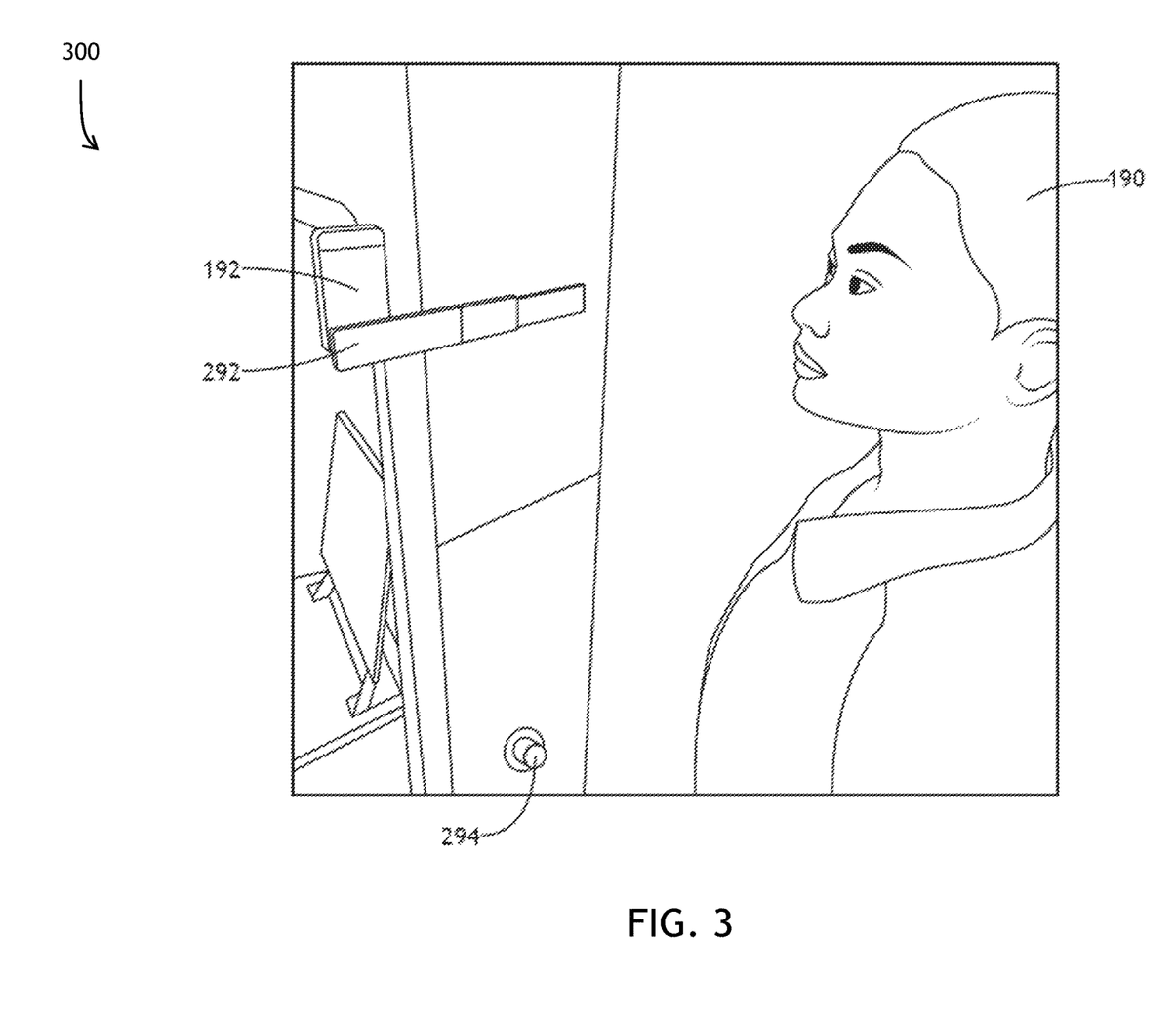
FIG. 3 is a diagram of a passenger interaction setup exemplary of an embodiment of the inventive concepts disclosed herein.

FIG. 3 Display Setup

Referring to FIG. 3, a diagram 300 of a passenger interaction setup exemplary of an embodiment of the inventive concepts disclosed herein is shown. PED 192 may be fully integrated within the system for passenger interaction 100 allowing passenger 190 interaction via the PED 192 through the wireless interface 156. In this example, the passenger 190 may place the PED 192 within a PED holding device 292 and interact with the processor 160. For example, the passenger 190 may use a voice command or a remote actuator 294 (a subset of the passenger interface 142) to command the hardware within the PED 192 to take a picture of the passenger 190 near the display 144.

The system for passenger interaction 100 may display the environment to the passenger 190 via the display 144 or the PED 192 and request permission to share the environment via social media. The passenger 190 may then choose to take and additional picture or transmit as desired.

Figure 4:
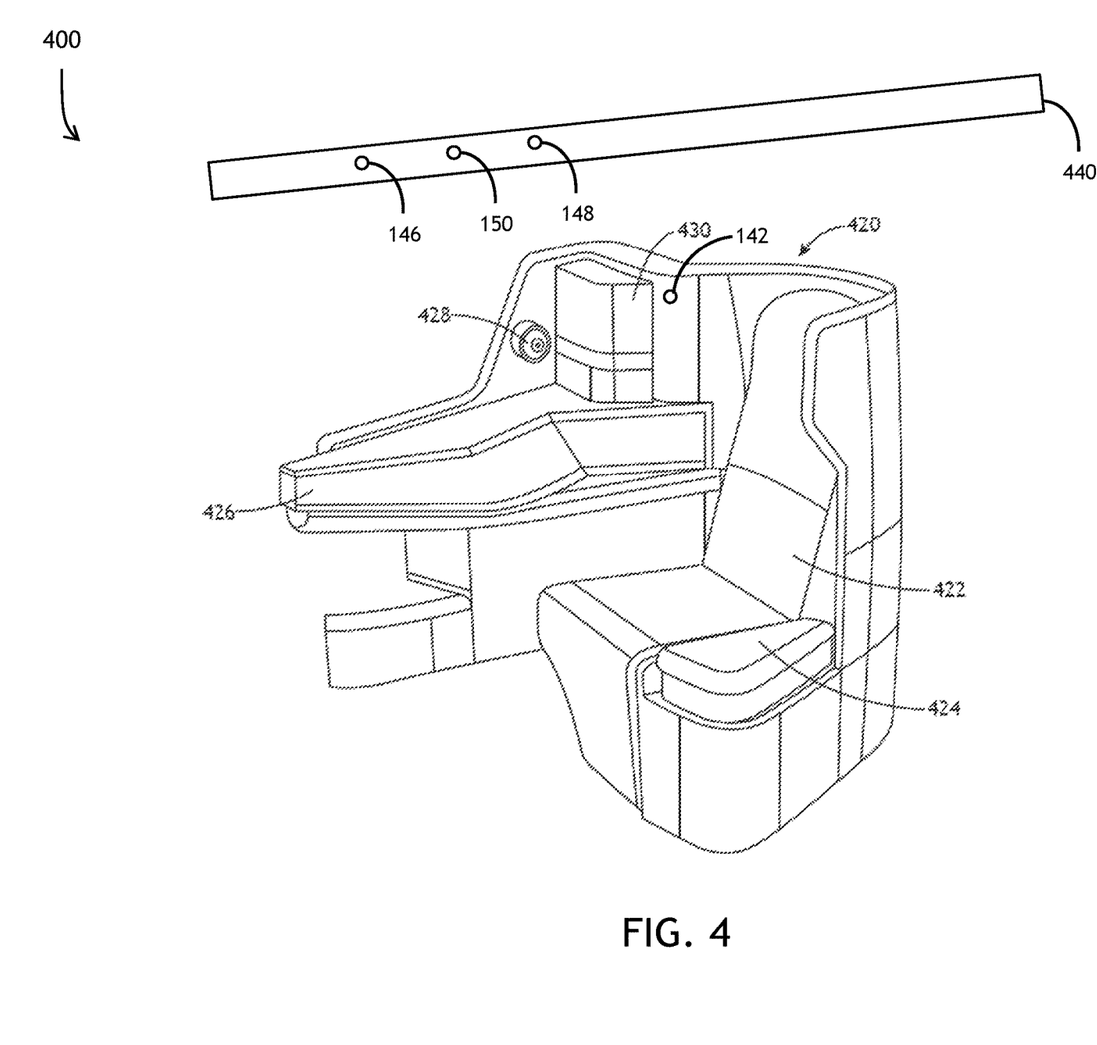
FIG. 4 is a diagram of an aircraft seat capable of interaction with the system for passenger interaction exemplary of one embodiment of the inventive concepts disclosed herein.

FIG. 4 Passenger Seat

Referring to FIG. 4, a diagram 400 of an aircraft seat capable of interaction with the system for passenger interaction 100 exemplary of one embodiment of the inventive concepts disclosed herein is shown. In one embodiment of the inventive concepts disclosed herein, elements of the system for passenger interaction 100 may embed portions of the vehicle interior structure within the augmented reality of the system for passenger interaction 100. In this manner, the passenger 190 may physically interact with portions of the interior cabin of the vehicle while virtually interacting in a completely different manner with the virtual elements presented to the passenger 190 by the system for passenger interaction 100. For example, the aircraft seat 420 may operate normally as a first-class business seat while virtually operate as a virtual cockpit seat while within the augmented reality of the system for passenger interaction 100. The passenger 190 may physically manipulate a seat light 428 switch while virtually manipulating a virtual switch with a completely separate function while in the virtual environment.

The passenger 190 may choose to interact with the system for passenger interaction 100 via the passenger interface 142 via VR headgear physically connect to the processor 160 via a corded connection plugged into the passenger interface 142.

In one embodiment, each item within reach of the passenger 190 may possess a physical function on board the aircraft while possessing an unlimited number of alternate function while in the virtual environment. For example, the physical seat light 428 may virtually operate as a button to virtually shoot a missile while a right side panel 426 and left side panel 424 may be blank panels in the physical while becoming filled with switches and actuators in the augmented and virtual environment. As the passenger 190 may reach out and touch the right side panel 426, the visual sensor 146 sited within an overhead panel 440 overhead the aircraft seat 420 may capture and track the movement of the passenger hand and passenger finger and produce the result of the virtual switch in the virtual environment.

Similarly, the right upper panel may physically operate to extend a tray table to the passenger 190 while virtually operating to extend a heads up display for use by the passenger 190. Each movement of the physical element of the aircraft furniture may operate to virtually manipulate systems and processes within the virtual environment the system for passenger interaction 100.

In another embodiment, additional features of the aircraft seat 420 may operate to manipulate the virtual systems presented to the passenger 190. For example, the aircraft seat 420 mounted video screen may virtually provide function to operate virtual systems the passenger 190 has chosen within the virtual environment. For example, the aircraft seat 420 display may change to an interactive computer controller for the system for passenger interaction 100 presented to the user in the virtual. For example, the passenger 190 may touch the physical screen associated with the aircraft seat 420 while immersed within the virtual sphere of system for passenger interaction 100 and be virtually operating a touch screen on board the space shuttle.

It is contemplated herein, the system for passenger interaction 100 may impact additional senses of the passenger 190. For example, haptic feedback within the passenger seat cushion 422 may offer a sense of motion when coordinated with signals presented to the passenger 190 via the VR hardware 152.

In one embodiment of the inventive concepts disclosed herein, the system for passenger interaction 100 may operate to allow the passenger 190 to remotely interact with others distant from the vehicle to incorporate within a remotely attended business meeting. For example, the user of system for passenger interaction 100 may be immersed within the augmented reality of the aircraft cabin sitting on a seat but also be directly communicating with others at the business meeting visually or holographically sitting at a conference table and remotely interacting with those personally sitting around the same conference table.

Figure 5:
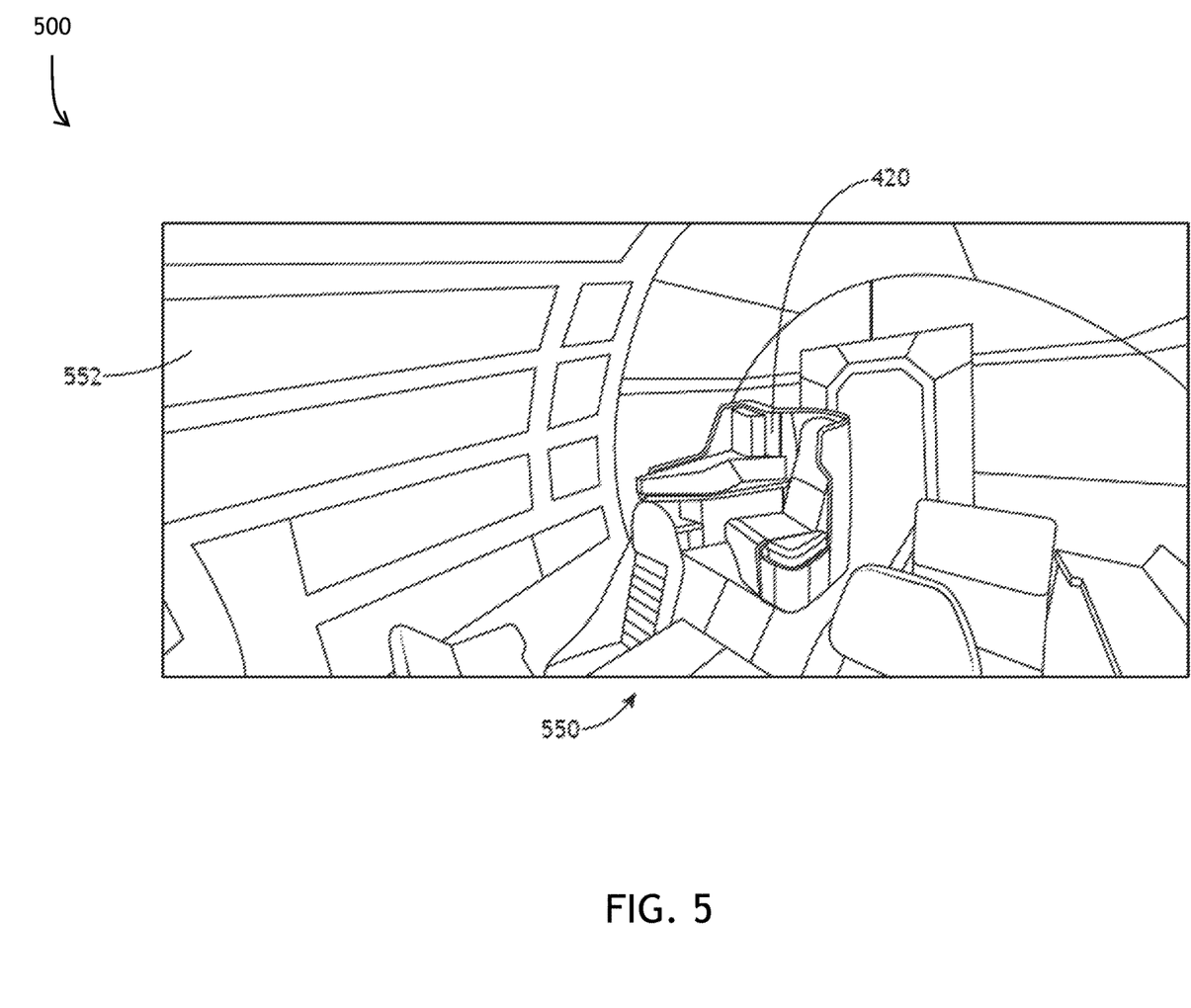
FIG. 5 is a diagram of an aircraft seat immersed within an augmented reality in accordance with one embodiment of the inventive concepts disclosed herein.

FIG. 5 Immersion of Passenger Seat

Referring to FIG. 5, a diagram 500 of an aircraft seat 420 immersed within an augmented reality in accordance with one embodiment of the inventive concepts disclosed herein is shown. In one embodiment, a passenger 190 on an aircraft may be placed within a digital property e.g. a digital asset of a popular motion picture film. The system for passenger interaction 100 may incorporate digital aspects from a motion picture related digital environment. The system for passenger interaction 100 may also incorporate the digital environment within the cabin of the aircraft and associated furniture into a virtual or augmented reality story. Not only would the passenger 190 be able to experience immersion within that story, the passenger 190 may then stream aspects, videos and still pictures from that immersive experience to a social media platform to share with others.

In one embodiment of the inventive concepts disclosed herein, the system for passenger interaction 100 may incorporate elements of the aircraft furniture into the augmented reality environment. For example, incorporation of the actual aircraft passenger seat 420 into the augmented reality of a spaceship cockpit 550. Further, incorporation of an actual aircraft window to a windscreen 552 within a virtual spaceship. Contemplated herein, the system for passenger interaction 100 may use augmented reality of the aircraft furniture immersed within a virtual presentation of a movie set or another virtual environment.

Figure 6:
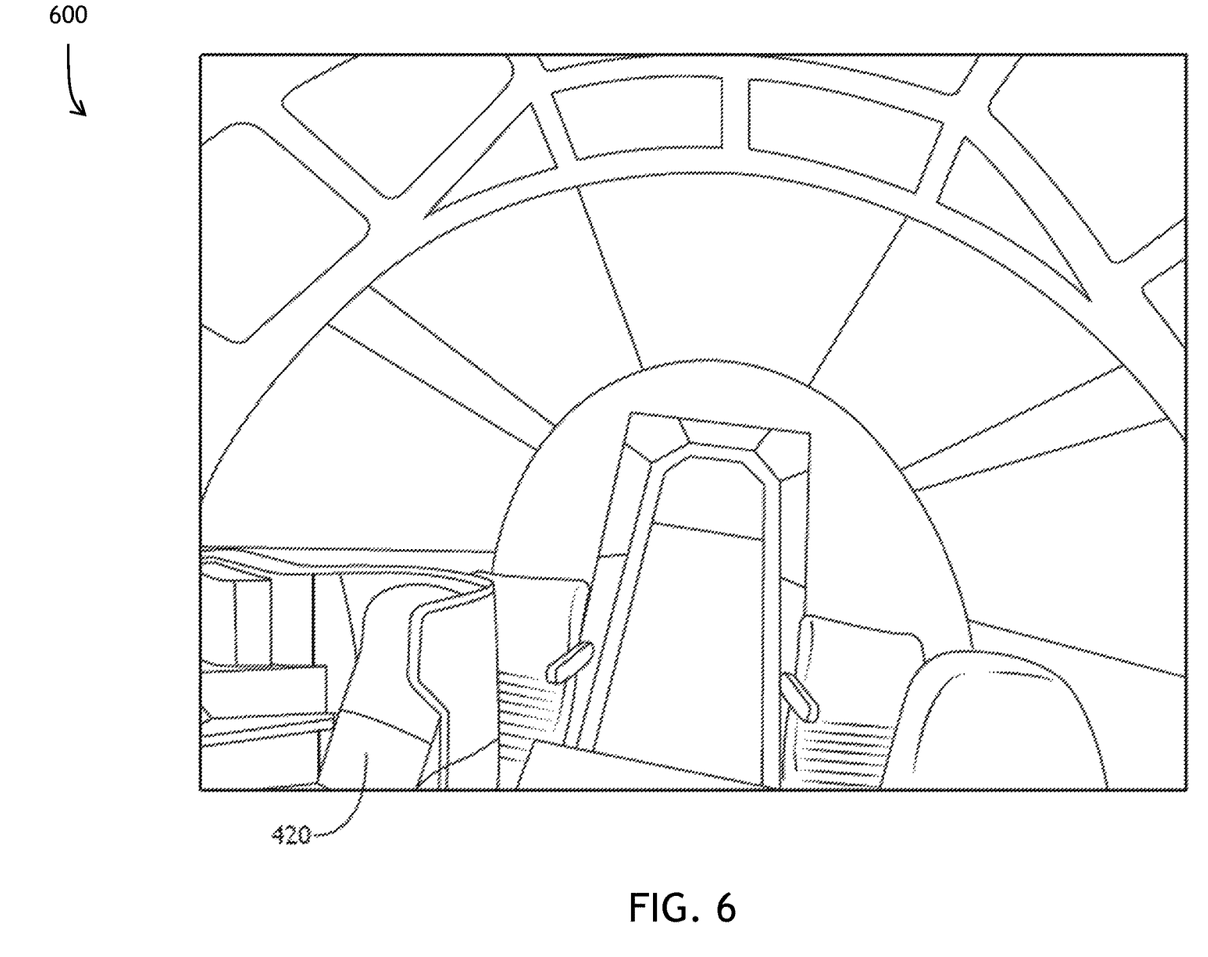
FIG. 6 is a diagram of an aircraft seat immersed within a co-pilot position in accordance with one embodiment of the inventive concepts disclosed herein.

FIG. 6 Cockpit Immersion

Referring to FIG. 6, a diagram 600 of an aircraft seat immersed within a co-pilot position in accordance with one embodiment of the inventive concepts disclosed herein is shown. In the exemplary embodiment of FIG. 6, the aircraft seat 420 is fully immersed within the augmented reality of the spaceship flight deck. The system for passenger interaction 100 may enable the passenger 190 to operate the augmented spaceship controls as she may choose.

Figure 7:
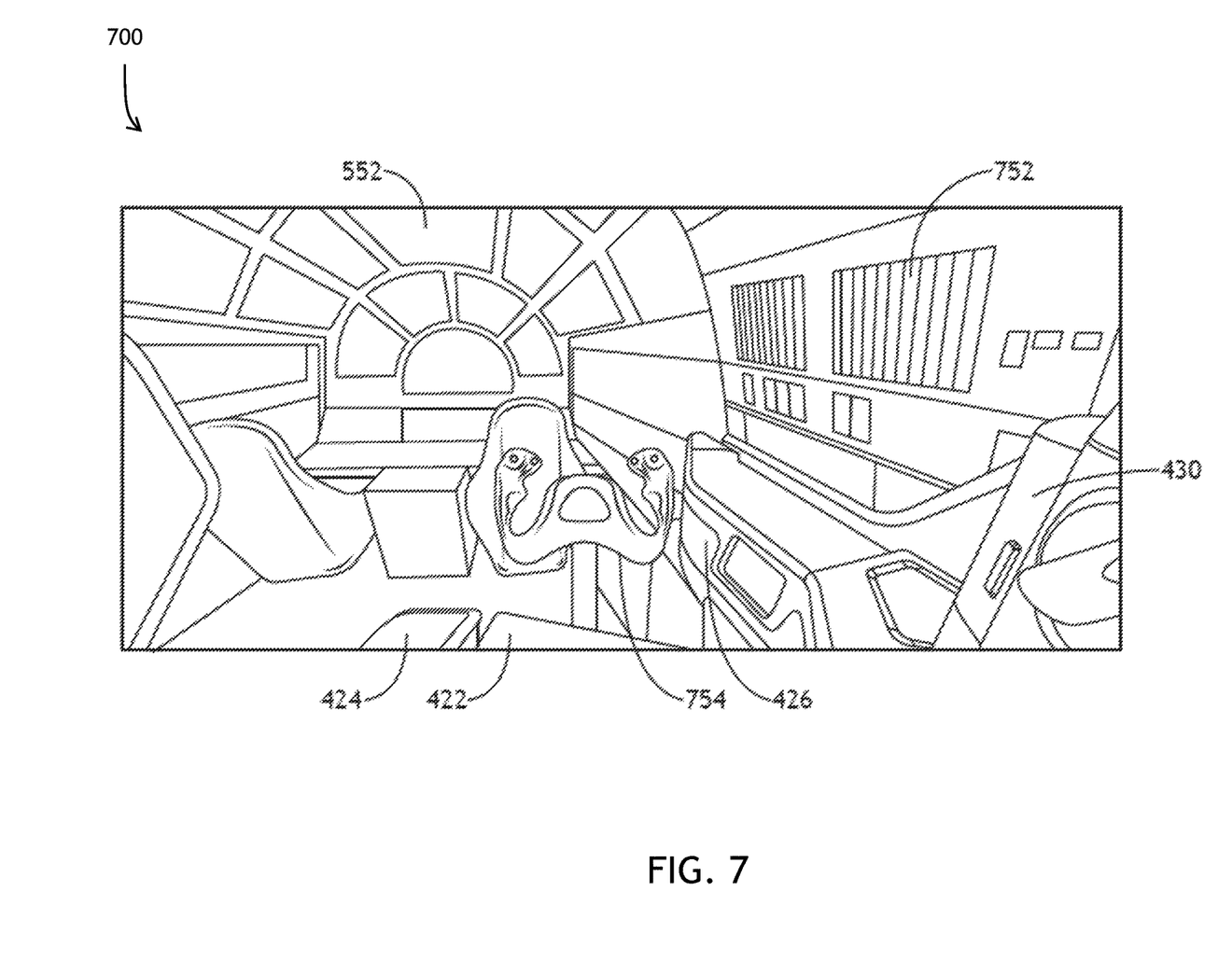
FIG. 7 a diagram of an immersed aircraft seat with a control yoke associated with one embodiment of the inventive concepts disclosed herein.

FIG. 7 Cockpit Controls

Referring to FIG. 7, a diagram 700 of an immersed aircraft seat with a control yoke associated with one embodiment of the inventive concepts disclosed herein is shown. The system for passenger interaction 100 may further allow the passenger 190 to fly the spaceship via a control yoke 754 presented to the passenger 190 proximal with the aircraft seat 420. In this example, the system for passenger interaction 100 may present to the passenger 190 a set of virtual flight deck controls 752 to enable passenger interaction with the displayed environment.

Figure 8:
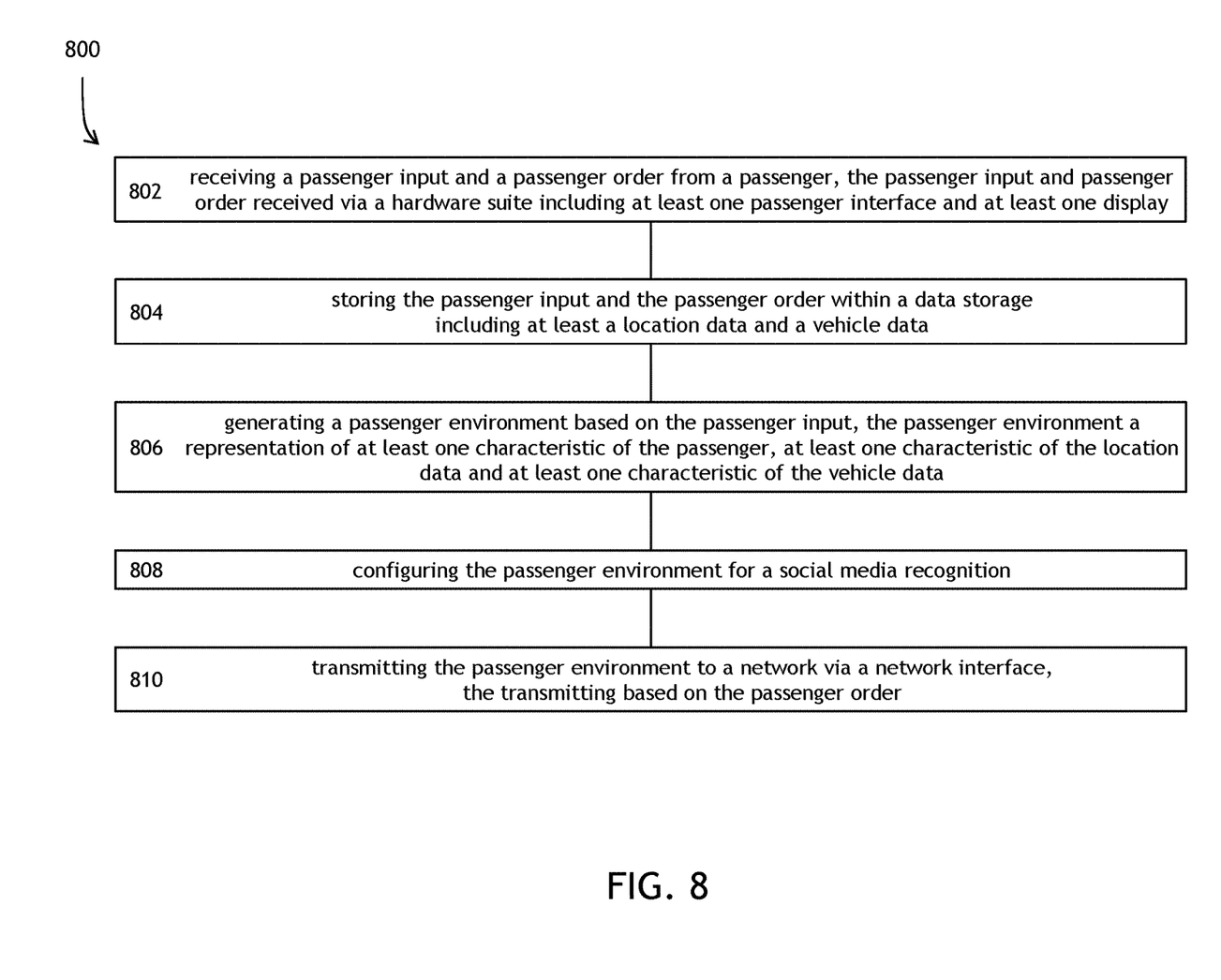
FIG. 8 is a flow diagram of a method for passenger interaction exemplary of one embodiment of the inventive concepts disclosed herein.

FIG. 8 Method Steps

Referring to FIG. 8, a flow diagram 800 of a method for passenger interaction exemplary of one embodiment of the inventive concepts disclosed herein is shown. A step 802 may include receiving a passenger input and a passenger order from a passenger, the passenger input and passenger order received via a hardware suite including at least one passenger interface and at least one display. The method may, at a step 804, store the passenger input and the passenger order within a data storage including at least a location data and a vehicle data. The method may, at a step 806, generate a passenger environment based on the passenger input, the passenger environment a representation of at least one characteristic of the location data and at least one characteristic of the vehicle data. The method may, at a step 808, configure the passenger environment for a social media recognition. At a step 810, the method may transmit the passenger environment to a network via a network interface, the transmitting based on the passenger order.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

Skilled artisans will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently.

What is claimed is:

1. A system for passenger interaction, comprising: a passenger computing device implemented within a cabin of a vehicle, the passenger computing device comprising: a data storage including at least a location data; a vehicle data, a furniture data and a communication data, the location data comprising information associated with a location outside the cabin of the vehicle, the furniture data comprising information associated with a plurality of features installed in the cabin of the vehicle; a hardware suite including at least one display and at least one passenger interface; a network interface; and a processor communicatively coupled to the data storage, the hardware suite and the network interface, the processor is configured for: receiving a passenger input and a passenger order from a passenger, the passenger input comprising user data of the passenger including at least one characteristic of the passenger obtained from an image of the passenger; generating a passenger environment based on the passenger input, the passenger environment being generated from the at least one characteristic of the passenger, at least one characteristic of the location data; at least one characteristic of the vehicle data and at least one characteristic of the furniture data; communicating at least a portion of the passenger environment to the passenger, the communication to the passenger including at least the portion of the passenger environment being generated on at least one surface of a feature of the plurality of features installed in the cabin of the vehicle; configuring the passenger environment for a social media recognition based on the communication data; and transmitting the passenger environment to a network, the transmitting based on the passenger order.

2. The system for passenger interaction of claim 1, further including a wireless interface communicatively coupled to the processor and configured to communicate with at least one of: a passenger portable electronic device (PED) or at least one element within the hardware suite.

3. The system for passenger interaction of claim 2, wherein the processor is further configured for:
receiving a network input via the network interface;
configuring the network input for passenger recognition; and
communicating the network input to the passenger via at least one of: the passenger PED or the at least one element within the hardware suite.

4. The system for passenger interaction of claim 2, wherein at least the portion of the passenger environment to the passenger is communicated via at least one of: the passenger PED or the at least one element within the hardware.

5. The system for passenger interaction of claim 2, wherein the passenger input and the passenger order are received from the passenger via at least one of: the passenger PED or the at least one element within the hardware suite.

6. The system for passenger interaction of claim 1, wherein the hardware suite further comprises a video sensor, a remote actuator, an audio sensor, a speaker, a virtual reality (VR) device and an augmented reality (AR) device, wherein the at least one display is incorporated within one of: the VR device or the AR device.

7. The system for passenger interaction of claim 1, wherein the data storage further comprises an environment data, wherein the environment data includes at least one of video and audio data associated with a motion picture or video and audio data associated with a sports figure or a celebrity.

8. The system for passenger interaction of claim 1, wherein the passenger input further comprises at least one of: an active passenger request or a sensed passenger presence, wherein the passenger order further comprises an immediate transmission, a delayed transmission or a storage.

9. The system for passenger interaction of claim 6, wherein the hardware suite is specifically configured for employment onboard an aircraft, wherein the plurality of features installed in the cabin of the aircraft includes at least one of a door, a bulkhead, an aircraft cabin window, an aircraft cabin walkway, or an aircraft seat.

10. The system for passenger interaction of claim 1, wherein at least the portion of the passenger environment includes one or more of the at least one characteristic of location data, the at least one characteristic of vehicle data or the at least one characteristic of furniture data being generated on the at least one surface of the feature of the plurality of features installed within the cabin of the vehicle.

11. A method for passenger interaction, comprising: receiving a passenger input and a passenger order from a passenger, the passenger input comprising user data of the passenger including at least one characteristic of the passenger obtained from an image of the passenger, the passenger input and passenger order received via a hardware suite including at least one passenger interface and at least one display; storing the passenger input and the passenger order within a data storage including at least a location data, a vehicle data, a furniture data and a communication data, the location data comprising information associated with a location outside a cabin of a vehicle, the furniture data comprising information associated with a plurality of features installed in the cabin of the vehicle; generating a passenger environment based on the passenger input, the passenger environment being generated from the at least one characteristic of the passenger, at least one characteristic of the location data, at least one characteristic of the vehicle data and at least one characteristic of the furniture data; communicating at least a portion of the passenger environment to the passenger, the communication to the passenger including at least the portion of the passenger environment being generated on at least one surface of a feature of the plurality of features installed in the cabin of the vehicle; configuring the passenger environment for a social media recognition based on the communication data; and transmitting the passenger environment to a network via a network interface, the transmitting based on the passenger order.

12. The method for passenger interaction of claim 11, wherein the passenger environment is at least one characteristic of the vehicle data and one of: a visual depiction of the passenger, an augmented visual depiction of the passenger or a virtual visual depiction of the passenger.

13. The method for passenger interaction of claim 11, wherein receiving the passenger input and passenger order from the passenger further comprises receiving the passenger input and passenger order via a wireless interface configured to communicate with at least one of: a passenger portable electronic device (PED) or at least one element within the hardware suite.

14. The method for passenger interaction of claim 13, further including:
receiving a network input via the network interface;
configuring the network input for passenger recognition; and
communicating the network input to the passenger via at least one of: the passenger PED or the at least one element within the hardware suite.

15. The method for passenger interaction of claim 13, wherein at least the portion of the passenger environment to the passenger is communicated via at least one of: the passenger PED or the at least one element within the hardware.

16. The method for passenger interaction of claim 11, wherein the hardware suite further comprises a video sensor, a remote actuator, an audio sensor, a speaker, a virtual reality (VR) device and an augmented reality (AR) device, wherein the at least one display is incorporated within one of: the VR device or the AR device.

17. The method for passenger interaction of claim 11, wherein the data storage further comprises an environment data, wherein the environment data includes at least one of video and audio data associated with a motion picture or video and audio data associated with a sports figure or a celebrity.

18. The method for passenger interaction of claim 11, wherein the passenger input further comprises at least one of: an active passenger request or a sensed passenger presence, wherein the passenger order further comprises an immediate transmission, a delayed transmission or a storage.

19. The method for passenger interaction of claim 16, wherein the hardware suite is specifically configured for employment onboard an aircraft, wherein the plurality of features installed in the cabin of the aircraft includes at least one of a door, a bulkhead, an aircraft cabin window, an aircraft cabin walkway, or an aircraft seat.

20. The method for passenger interaction of claim 11, wherein at least the portion of the passenger environment includes one or more of the at least one characteristic of location data, the at least one characteristic of vehicle data or the at least one characteristic of furniture data being generated on the at least one surface of the feature of the plurality of features installed within the cabin of the vehicle.

* * * * *